United States Patent [19]
Ramesh et al.

[11] Patent Number: 5,338,816
[45] Date of Patent: Aug. 16, 1994

[54] HYDROPHOBIC POLYELECTROLYTES USED IN REMOVING COLOR

[75] Inventors: Manian Ramesh, Naperville; John W. Sparapany, Bolingbrook; Martha R. Finck, Countryside; Kristine S. Siefert, Crete; Chandrashekar S. Shetty, Lisle, all of Ill.

[73] Assignee: Nalco Chemical Company, Naperville, Ill.

[21] Appl. No.: 132,946

[22] Filed: Oct. 7, 1993

Related U.S. Application Data

[62] Division of Ser. No. 935,550, Aug. 26, 1992, Pat. No. 5,283,306.

[51] Int. Cl.$^5$ .............................................. C08F 36/00
[52] U.S. Cl. ...................... 526/312; 526/73; 526/295; 526/328.5; 526/329.4; 526/329.7
[58] Field of Search .............. 526/312, 73, 295, 328.5, 526/329.4, 329.7

[56] References Cited

U.S. PATENT DOCUMENTS

| | | | |
|---|---|---|---|
| 4,151,202 | 4/1979 | Hunter et al. | 260/567.6 R |
| 4,715,962 | 12/1987 | Bhattacharyya et al. | 210/708 |
| 4,734,473 | 3/1988 | Fong et al. | 525/326.7 |
| 4,769,432 | 9/1988 | Fong | 525/326.7 |
| 4,802,992 | 2/1989 | Fong et al. | 526/263 |
| 4,968,435 | 11/1990 | Neff et al. | 524/922 |
| 5,006,596 | 4/1991 | Chen et al. | 524/801 |
| 5,152,903 | 10/1992 | Neff et al. | 524/922 |

*Primary Examiner*—Edward J. Cain
*Attorney, Agent, or Firm*—Robert A. Miller; Joseph B. Barrett; James J. Drake

[57] ABSTRACT

A hydrophobic polyelectrolyte copolymer which is useful in the removal of color in paper mill waste water. The copolymer preferably comprises diallyldimethylammonium chloride and a hydrophobic monomer selected from the group consisting of quaternized dimethylaminoethylacrylates and quaternized dimethylaminoethylmethacrylates.

18 Claims, No Drawings

HYDROPHOBIC POLYELECTROLYTES USED IN REMOVING COLOR

This application is a division of application Ser. No. 07/935,550, filed Aug. 26, 1992 now U.S. Pat. No. 5,283,306.

The present invention relates generally to polyelectrolyte compositions useful in the removal of color from pulp and paper waste waters. These polyelectrolyte compositions are preferably hydrophobically modified copolymers of diallyldimethylammonium chloride (DADMAC) and either dimethylaminoethylacrylate (DMAEA) or dimethylaminoethylmethacrylate (DMAEM).

BACKGROUND OF THE INVENTION

Color removal from the effluent streams of paper mills continues to be a problem within the pulp and paper industry. It is necessary that these downstream waste waters be treated for color removal prior to discharge into public waterways.

The United States wood pulp production capacity is approximately 60 million tons per year. Since the average cellulose content of wood is about 40%, 150 million tons of wood are needed to produce this 60 million tons of pulp. The difference between these two numbers represents the lignin and hemicellulose which must be removed or separated in the pulping process in order to free the cellulose fibers.

The pulping process, however, does not remove 100% of the lignin present in the wood, with approximately 5% remaining after either kraft or sulfite pulping (for mechanical pulping the amount is considerably higher). If a high grade paper is the desired end product, this 5% residual lignin must be removed, and is accomplished by bleaching the pulp.

Since over 35% of the pulp produced in the United States is bleached, there are about one million tons of lignin removed each year at the bleach plant, and most of this in the caustic extraction stage. This number is significant because in the removal process (i.e., bleaching), most of this residual lignin is solubilized. This solubilized lignin is a strong absorber of visible radiation resulting from the conjugation of unsaturated and quinoidal moieties formed during the oxidation step in the bleach plant. Consequently, the bleach plant effluent is highly colored. Although there are other sources of color in paper mill waste effluent, it is readily apparent that where bleaching is performed its effluent can be expected to be the major contributor of waste color. Indeed, at kraft, bleach mills the effluent from the first caustic extraction stage accounts for at least 70% of the waste color.

The goal of the pulping and bleaching operations is the removal of lignin and hemicellulose from the cellulose fiber in the wood. The 95% that is removed by pulping is often burned as fuel in the process of recovering the inorganic chemicals present in the black liquor. In the bleaching operation, the 5% residual lignin is separated from the fibers by degradation and solubilization and ends up in the waste water. Chemical removal can, therefore, only be accomplished by reducing this solubility, which has proved to be a difficult task.

Therefore, the primary source of color in pulp is lignin. It has also been suggested that kraft color is due to ketoenols produced from carbohydrates during the kraft cook stage in the papermaking process. Chlorination of the pulp during the bleaching operation results in the formation of color bodies which are leached from the pulp by caustic alkali solutions. Thus, the caustic extract effluent contains a major proportion of the color bodies and the other organic materials which have to be disposed during the waste water treatment.

The process of color removal from the effluent stream is complicated further by the presence of lime, solid particulate matter like pulp, clay, dispersants/surface active materials and polymers used during various stages in the papermaking process. The solid particulate matter is commonly referred to as anionic trash.

Most governmental regulations pertaining to color removal from the effluent stream of a papermaking process are directed to true color, i.e., the color at pH of 7.6 after filtration through a 0.8 micrometer filter paper and expressed as Pt Co Color units (i.e., platinum cobalt color using a DR2000 spectrophotometer). Nevertheless, there is increasing pressure on pulp and paper mills to lower the apparent color of the effluent water because that is the color visible to the naked eye as the effluent flows into public waterways. There are occasions when the true color of a system that has undergone treatment is low, but the corresponding apparent color is high. This problem is commonly caused by the presence of suspended particulate matter that causes an increase in the turbidity of the system. Therefore, it is important that any new treatment for color removal should not only remove the true color of the effluent, but should also lower the apparent color as well.

The pressure to remove color comes primarily from state environmental agencies. Previously, it was thought that the discharge of colored waste affected only the aesthetic value of the receiving body of water; however, biologists are becoming increasingly concerned about possible toxic effects, the effect of reduced light transmittance through the water causing reduced levels of photosynthetic activity, and of course, the resultant drop in dissolved oxygen concentration because of this drop in activity. Furthermore, although these colored, waste products are fairly refractory towards biological oxidation and since they become degraded in the aquatic environment, the oxidation products may be potentially harmful.

It has been shown that by-products are water soluble, and that a significant amount is produced. This puts severe demands on chemicals to be used for color removal. There are techniques already available, however, that can remove greater than 90% of the color from either total mill effluent or isolated waste streams, such as from the caustic extraction stage of the bleach plant. These techniques include chemical (e.g., alum, ferric, lime or polyelectrolytes), biological (e.g., white rot fungus) and physical processes (e.g., ultrafiltration, ion exchange and carbon absorption). None enjoys widespread use because of unfavorable economics.

The demands on a product used in a color removal application are quite severe, i.e., the product must be capable of reacting with the color bodies in a manner which results in their becoming insoluble and, because of the extremely large amounts produced, the color removal product must work at very low weight ratios relative to the organic being removed or its use will be precluded by prohibitive costs.

A common problem associated with conventional treatment methods, such as epichlorohydrin/dimethylamine (Epi/DMA), is the fact that those polymers cannot lower the color of a system below a certain value beyond which they tend to redisperse the color. This problem is commonly referred to as "overdosage."

The present inventors have discovered through extensive experimentation that hydrophobically modified copolymers are excellent agents for the removal of both "apparent" and "true" color in pulp and paper mill waste water. The color removal characteristics of diallyldimethylammonium chloride (DADMAC) is significantly improved by imparting a certain degree of hydrophobicity. Modification is accomplished by copolymerizing DADMAC with a selected hydrophobic monomer to form a hydrophobic polyelectrolyte. These hydrophobic polyelectrolytes display excellent replacement ratios, while avoiding the problem of "overdosage" which frequently arises when conventional polymers are used to remove color.

The present invention also provides many additional advantages which shall become apparent as described below.

SUMMARY OF THE INVENTION

Hydrophobic polyelectrolyte copolymers are useful in the removal of color from pulp and paper mill waste waters. These hydrophobic polyelectrolyte copolymers comprise diallyldimethylammonium chloride (DADMAC) and a hydrophobic monomer. The hydrophobic monomer is preferably selected from an appropriately quaternized dimethylaminoethylacrylate (DMAEA) or dimethylaminoethylmethacrylate (DMAEM).

The quaternized DMAEA and DMAEM monomers may include methyl chloride quaternary (MCQ) or $C_4$ to $C_{20}$ chloride quaternaries. The $C_4$ to $C_{20}$ chloride quaternaries may be either aliphatic (e.g., cetyl chloride quaternary (CCQ)) or aromatic (e.g., benzyl chloride quaternary (BCQ)). Cationic monomers may also include sulfate, bromide or other similar quaternaries.

These hydrophobic polyelectrolyte copolymers are preferably made via a semi-batch process. The semi-batch process typically comprises the steps of: (a) adding diallyldimethylammonium chloride to a polymerization reactor vessel in an amount between about 1 to about 19 weight percent; (b) heating the diallyldimethylammonium chloride to a temperature in the range between about 47° C. to about 57° C.; (c) adding a polymer initiator dropwise to the diallyldimethylammonium chloride in an amount between about 0.05 to about 0.4 weight percent; (d) adding a hydrophobic monomer dropwise to the diallyldimethylammonium chloride in an amount between about 3 to about 19 weight percent; and (e) heating the mixture of diallyldimethylammonium chloride, polymer initiator and hydrophobic monomer to a temperature in the range between about 47° C. to about 82° C.

These novel hydrophobic polyelectrolytes are particularly useful in removing color from a paper mill waste effluent. The method for removing color includes the step of adding a hydrophobic polyelectrolyte copolymer to the paper mill waste effluent.

Other and further objects, advantages and features of the present invention will be understood by reference to the following specification.

DESCRIPTION OF THE PREFERRED EMBODIMENTS

The hydrophobic polyelectrolyte copolymers described herein are particularly useful in color removal, coal coagulation, pitch control and residual oil removal applications. It has been discovered that the performance of poly(DADMAC) can be significantly improved by incorporating a certain degree of hydrophobic nature. Such a modification can be accomplished by copolymerizing DADMAC with hydrophobic monomers, such as, DMAEA.BCQ, DMAEM.BCQ, DMAEA.CCQ, DMAEM.CCQ, DMAEA.MCQ and DMAEM.MCQ. Moreover, these copolymers are particularly effective in removing color from effluents of papermaking processes when they are prepared via a semi-batch technique instead of a batch mode.

The hydrophobic polyelectrolyte copolymer preferably comprises a diallyldimethylammonium chloride and a hydrophobic monomer. The hydrophobic monomer is one monomer selected from the group consisting of: quaternized dimethylaminoethylacrylates and quaternized dimethylaminoethylmethacrylates. DMAEA and DMAEM are preferably quaternized using $C_4$ to $C_{20}$ chloride quaternaries or methyl chloride quaternaries. The preferred $C_4$ to $C_{20}$ aromatic and aliphatic chloride quaternaries are benzyl chloride quaternary and cetyl chloride quaternary, respectively.

The DADMAC can be prepared in accordance with any conventional manner such as the technique described in U.S. Pat. No. 4,151,202 (Hunter et al.), which issued on Apr. 24, 1979, and which is incorporated herein by reference.

The quaternized dimethylaminoethylacrylate is selected from the group consisting of: dimethylaminoethylacrylate methyl chloride quaternary and dimethylaminoethylacrylates having $C_4$ to $C_{20}$ chloride quaternary. The dimethylaminoethylacrylates having $C_4$ to $C_{20}$ chloride quaternary are preferably either dimethylaminoethylacrylate benzyl chloride quaternary or dimethylaminoethylacrylate cetyl chloride quaternary.

The quaternized dimethylaminoethylmethacrylate is selected from the group consisting of: dimethylaminoethylmethacrylate methyl chloride quaternary and dimethylaminoethylmethacrylates having $C_4$ to $C_{20}$ chloride quaternary. The dimethylaminoethylmethacrylates having $C_4$ to $C_{20}$ chloride quaternary are preferably either dimethylaminoethylmethacrylate benzyl chloride quaternary or dimethylaminoethylmethacrylate cetyl chloride quaternary, The diallyldimethylammonium chloride and the hydrophobic monomer are preferably present in a molar ratio in the range from 99:1 to 20:80.

The unique semi-batch process for making the hydrophobic polyelectrolyte copolymers according to the present invention comprises the following steps:

a. adding diallyldimethylammonium chloride to a polymerization reactor vessel in an amount between about 1 to about 19 weight percent;

b. heating the diallyldimethylammonium chloride to a temperature in the range between about 47° C. to about 57° C.;

c. adding a polymer initiator dropwise to the diallyldimethylammonium chloride in an amount between about 0.05 to about 0.40 weight percent;

d. adding a hydrophobic monomer dropwise to the diallyldimethylammonium chloride in an amount between about 3 to about 19 weight percent; and e. heating the mixture of diallyldimethylammonium chloride, polymer initiator and hydrophobic monomer to a temperature in the range between about 47° C. to about 82° C.

Typically, deionized water is added periodically as needed during the polymerization process in a total amount between about 63 to about 88 weight percent.

In some instances it is preferable to mix diallyldimethylammonium chloride with NaCl and deionized water prior to addition to the reactor vessel. The NaCl is added in an amount between about 2 to about 3.5 weight percent and the deionized water is added in an amount between about 1 to about 2.5 weight percent. This diallyldimethylammonium chloride solution has a concentration of diallyldimethylammonium chloride in the range between about 54 to about 59.

This semi-batch process produces a hydrophobic polyelectrolyte copolymer with a pH in the range from about 3.5 to about 4.5.

The diallyldimethylammonium chloride, polymer initiator and hydrophobic monomer are heated at a temperature in the range between about 47° C. to about 57° C. for a period of between about 6 to 8 hours. Thereafter, the temperature of the reactor vessel is increased to about 72° C. to about 82° C. for a period of between about 5 to 7 hours. After polymerization has been completed the copolymer product is typically diluted with deionized water, cooled and stored.

The polymer initiator is selected from the group consisting of 2,2'-azobis(2-amidinopropane) hydrochloride (Vazo(50), ammonium persulfate, 2,2'-azobis(N,N'-dimethylene isobutylamide) dihydrochloride, and ammonium persulfate/sodium meta bisulfite.

The present invention can best be understood by reference to the following working and comparative examples.

EXAMPLE 1

A hydrophobic polyelectrolyte copolymer was formed from diallyldimethylammonium chloride (DADMAC) and dimethylaminoethylmethacrylate cetyl chloride quaternary (DMAEM.CCQ) monomers using a batch process. The following reagents were used:

| | | |
|---|---|---|
| 251.30 | grams | 62% Solution of DADMAC |
| 150.00 | grams | 20% Solution of DMAEM.CCQ |
| 0.30 | grams | Versene |
| 10.00 | grams | Adipic Acid |
| 15.00 | grams | 25% Solution of Ammonium Persulfate |
| 75.08 | grams | Deionized Water |

DADMAC was added to a mixture of DMAEM.CCQ, adipic acid, versene, and deionized water. This reaction mixture was then heated to about 50° C. and thereafter the ammonium persulfate was added. The reactor vessel was purged with nitrogen at 10 psig and stirred at about 250 rpm. After 30 minutes a precipitate began to form so an additional 154.76 grams of a 62% solution of DADMAC, 10 grams of a 25% solution of ammonium persulfate and 0.10 grams of versene were added to the reactor vessel. Thereafter, the temperature of mixture was increased to 65° C. for 6 hours and then cooled to ambient temperature. The final molar ratio of DADMAC to DMAEM.CCQ was 96.68% to 3.32%.

The preparation of DMAEM.CBQ (dimethylaminoethylmethacrylate cetyl bromide quaternary) was effected as follows:

| | | |
|---|---|---|
| 80.00 | grams | 97% Cetyl Bromide |
| 40.00 | grams | 99% DMAEM |
| 0.08 | grams | Hydroquinnone |
| 500.00 | grams | Ethanol |

The above reactants were combined and heated at reflux for 4 hours. The solvent (i.e., ethanol) was removed under reduced pressure. A gummy liquid upon cooling afforded pale pink colored solid DMAEM.CBQ monomer in 96% yield. This monomer was then dissolved in deionized water to a desired dilution.

The preparation of DMAEM.CCQ was effected by stirring an aqueous solution (25% actives) of DMAEM.CBQ (1,000 grams), prepared as above, with Amberlite IRA-400 (Cl−) ion exchange resin for 30 minutes. The resin was filtered and the monomer used in subsequent polymerizations.

EXAMPLE 2

A hydrophobic polyelectrolyte copolymer was formed from 70% DADMAC and 30% dimethylaminoethylacrylate benzyl chloride quaternary (DMAEA.BCQ) monomers. The following reagents were used:

| | | |
|---|---|---|
| 188.03 | grams | 62% Solution of DADMAC |
| 104.28 | grams | 80% Solution of DMAEA.BCQ |
| 0.20 | grams | Versene |
| 15.00 | grams | 25% Solution of Ammonium Persulfate |
| 692.49 | grams | Deionized Water |

DADMAC and 100 grams of deionized water were placed within a polymerization reactor vessel which was purged with nitrogen at 10 psig. Thereafter, the ammonium persulfate was added dropwise to the reactor vessel via a syringe pump for 2 hours. Simultaneously, DMAEA.BCQ was added dropwise to the reactor vessel via a syringe pump for 2 hours. The DMAEA.BCQ was diluted with 100 grams of deionized water prior to being loaded into the syringe pump. Thereafter, the remaining deionized water and versene were added to the reactor vessel which was then heated at 65° C. for 6 hours.

EXAMPLE 3

A hydrophobic polyelectrolyte copolymer was formed from 70% DADMAC and 30% dimethylaminoethylacrylate benzyl chloride quaternary (DMAEA.BCQ) monomers. The following reagents were used:

| | | |
|---|---|---|
| 188.03 | grams | 62% Solution of DADMAC |
| 104.28 | grams | 80% Solution of DMAEA.BCQ |
| 0.20 | grams | Versene |
| 1.17 | grams | Vazo (50) |
| 706.00 | grams | Deionized Water |
| 0.32 | grams | $H_2SO_4$ |

DADMAC was placed within a polymerization reactor vessel which was purged with nitrogen at 10 psig, stirred at 300 rpm and a torque of 350 dynes-cm. The pH was adjusted to 3.5 by addition of $H_2SO_4$. After 40 minutes the torque gradually increased to 2240 dynes-cm. Thereafter, 100 grams of deionized water was added to the DADMAC which reduced the torque to 850 dynes-cm. This was followed by the dropwise addition of Vazo (50) and DMAEA.BCQ via separate syringe pumps for 2 hours. The DMAEA.BCQ was diluted with 100 grams of deionized water. The reactor vessel was then heated at 65° C. for 5 hours. After 2 hours and 20 minutes the torque reached 2920 dynes-cm. 100 grams of deionized water was again added which reduced the torque to 1180 dynes-cm. After 3 hours and 15 minutes another 100 grams of deionized water was added to the polymerizing product. After 5 hours another 100 grams of deionized water was added to the reactor vessel and the temperature was raised to 80° C. for 1 hour. Thereafter, the resulting polymer was diluted with the remaining deionized water, cooled and stored.

EXAMPLE 4

A hydrophobic polyelectrolyte copolymer was formed from 80% DADMAC and 20% dimethylaminoethylmethacrylate cetyl chloride quaternary (DMAEM.CCQ) monomers. The following reagents were used:

| | |
|---|---|
| 188.02 grams | 62% Solution of DADMAC |
| 83.43 grams | DMAEM.CCQ |
| 0.20 grams | Versene |
| 1.17 grams | Vazo (50) |
| 727.03 grams | Deionized Water |
| 0.15 grams | $H_2SO_4$ |

DADMAC was placed within a polymerization reactor vessel which was purged with nitrogen at 10 psig and stirred at 300 rpm. The pH was adjusted to 3.5 by addition of $H_2SO_4$. 150 ml of deionized water was added to the DADMAC. This was followed by the dropwise addition of Vazo (50) and DMAEA.CCQ via separate syringe pumps for 2 hours. The DMAEA.CCQ was diluted with 100 grams of deionized water. The reactor vessel was then heated at 65° C. for 4.5 hours. Between 1.5 to 2 hours 180 ml of deionized water was again added. After 4.5 hours the temperature was raised to 70° C. for 0.5 hours. Thereafter, the resulting polymer was diluted with the remaining deionized water, cooled and stored.

EXAMPLE 5

A hydrophobic polyelectrolyte copolymer was formed using the same technique described in Example 4 above from 80% DADMAC and 20% dimethylaminoethylacrylate benzyl chloride quaternary (DMAEA.BCQ) monomers. The following reagents were used:

| | |
|---|---|
| 227.52 grams | 62% Solution of DADMAC |
| 73.68 grams | 80% Solution of DMAEA.BCQ |
| 0.40 grams | Versene |
| 1.42 grams | Vazo (50) |
| 696.63 grams | Deionized Water |
| 0.35 grams | $H_2SO_4$ |

However, the water was added as needed. Table 1 below sets forth the time of deionized water addition during the semi-batch polymerization process.

TABLE 1

| SPEED OF ROTATION (RPM) | TORQUE (DYNES-CM) | TIME | $H_2O$ ADDITION |
|---|---|---|---|
| 200 | 400 | 0 | 0 |
| 200 | 850 | 30 min. | 0 |
| 200 | 1200 | 45 min. | 50 grams |
| 200 | 700 | 45.1 min. | — |
| 200 | 1600 | 1 hr. 10 min. | 50 grams |
| 200 | 1000 | 1 hr. 10.1 min. | — |
| 200 | 1510 | 1 hr. 35 min. | 50 grams |
| 200 | 1200 | 1 hr. 35.1 min. | 50 grams |
| 200 | 650 | 1 hr. 35.2 min. | — |
| 200 | 1500 | 1 hr. 55 min. | — |
| 200 | 1610 | 2 hr. 12 min. | 50 grams |
| 200 | 558 | 2 hr. 12.1 min. | — |

EXAMPLE 6

A hydrophobic polyelectrolyte copolymer was formed from 90% DADMAC and 10% dimethylaminoethylacrylate benzyl chloride quaternary (DMAEA.BCQ) monomers. The following reagents were used:

| | |
|---|---|
| 251.79 grams | 67% Solution of DADMAC |
| 39.13 grams | 80% Solution of DMAEA.BCQ |
| 0.20 grams | Versene |
| 3.36 grams | Vazo (50) |
| 678.00 grams | Deionized Water |
| 27.52 | NaCl |

The semi-batch procedure was as follows:
(1) A DADMAC solution was prepared by evaporating a solution comprising: 251.79 grams of a 67% solution of DADMAC, 27.52 grams of NaCl and 16.6 grams of deionized water for 30 minutes.
(2) The polymerization reactor vessel was then purged with nitrogen, stirred at 200 rpm and heated to 57° C.
(3) Then 40 mg of versene were added to the reactor vessel.
(4) 39.13 grams of DMAEA.BCQ were diluted with 15.87 grams of deionized water, then 160 mg of versene were added, stirred and loaded into a syringe pump.
(5) 500 grams of water were disposed in a funnel adjacent to the reactor vessel and nitrogen sparged continuously.
(6) 1.68 grams of Vazo (50) were dissolved in 45.16 grams of deionized water and loaded into another syringe pump.
(7) At 57° C., 11.7 grams of the Vazo (50) solution were added to the reactor vessel, together with the dropwise addition of the DMAEA.BCQ.
(8) Additional deionized water was added from time to time as required.
(9) After 5 hours the temperature was raised to 82° C. for 1 hour.
(10) Thereafter, the resulting polymer was diluted with the remaining deionized water, cooled and stored.

EXAMPLE 7

A hydrophobic polyelectrolyte copolymer of 70% DADMAC and 30% DMAEA.BCQ was compared against an epichlorohydrin/dimethylamine (Epi/DMA) polymer to evaluate their performance in removing color from papermaking effluent. The results are set forth below in Table 2:

TABLE 2

| POLYMER DOSAGE (PPM) | PT.CO.COLOR UNITS | % COLOR REMOVAL |
|---|---|---|
| EPI/DMA | | |
| 0 | 1360 | — |
| 50 | 560 | 59 |
| 80 | 420 | 69 |
| 100 | 366 | 73 |
| 150 | 332 | 76 |
| 200 | 364 | 73 |
| DADMAC/DMAEA.BCQ | | |
| 50 | 570 | 58 |
| 80 | 442 | 67.5 |
| 100 | 358 | 74 |
| 150 | 284 | 79 |
| 200 | 116 | 81 |
| 250 | 234 | 83 |
| 300 | 228 | 83 |

As demonstrated above the hydrophobic polyelectrolyte copolymer of DADMAC and DMAEA.BCQ exhibited increased color removal at higher dosages verses the Epi/DMA polymer. Moreover, the percent color removal begins to decrease when the dosage of the Epi/DMA polymer is increased from 150 ppm to 200 ppm, i.e., 76% to 73%. This occurs due to "overdosage" which tends to redisperse the color after a certain dosage of conventional polymers. To the contrary, the hydrophobic polyelectrolyte copolymer of DADMAC/DMAEA.BCQ continues to remove large percentages of color at dosages as high as 300 ppm. As such, the DADMAC/DMAEA.BCQ copolymer does not appear to be subject to "overdosage."

EXAMPLE 8

A hydrophobic polyelectrolyte copolymer of 90% DADMAC and 10% DMAEA.BCQ was tested for color removal properties in an effluent from a papermaking mill. The results are set forth below in Table 3:

TABLE 3

| POLYMER DOSAGE (PPM) | PT.CO.COLOR UNITS | % COLOR REMOVAL |
|---|---|---|
| 50 | 178 | 69.8 |
| 80 | 48 | 92 |
| 100 | 38 | 93.5 |

The aforementioned hydrophobic polyelectrolyte copolymer system exhibited extremely high color removal properties.

EXAMPLE 9

A hydrophobic polyelectrolyte copolymer of 70% DADMAC and 30% DMAEA.BCQ was compared against an epichlorohydrin/dimethylamine (Epi/DMA) polymer to evaluate their performance in removing color from papermaking effluent having a pH of 9.2. The results are set forth below in Table 4:

TABLE 4

| POLYMER DOSAGE (PPM) | PT.CO.COLOR UNITS | % COLOR REMOVAL |
|---|---|---|
| EPI/DMA | | |
| 40 | 284 | 65 |
| 60 | 212 | 74 |
| 80 | 148 | 82 |
| 100 | 130 | 84 |
| 200 | 208 | 74 |
| 300 | 360 | 56 |
| 400 | 444 | 45 |
| DADMAC/DMAEA.BCQ | | |
| 40 | 280 | 65 |
| 60 | 284 | 65 |
| 80 | 166 | 80 |
| 100 | 138 | 83 |
| 150 | 102 | 87 |
| 200 | 122 | 85 |
| 300 | 240 | 70 |

As demonstrated above the hydrophobic polyelectrolyte copolymer of DADMAC and DMAEA.BCQ exhibited increased color removal at higher dosages verses the Epi/DMA polymer. See dosages of 150, 200 and 300 ppm wherein the DADMAC/DMAEA.BCQ copolymer exhibited color removal of 87.4, 85 and 70.3, respectively. Moreover, the percent color removal dramatically decreases when the dosage of the Epi/DMA polymer is increased from 100 ppm to 200 ppm, i.e., 84% to 74%. This occurs due to "overdosage" which tends to redisperse the color after a certain dosage of conventional polymers. To the contrary, the hydrophobic polyelectrolyte copolymer of DADMAC/DMAEA.BCQ continues to remove large percentages of color at dosages as high as 300 ppm, i.e., color removal of 70.3%. As such, the DADMAC/DMAEA.BCQ copolymer does not appear to be subject to "overdosage."

EXAMPLE 10

A hydrophobic polyelectrolyte copolymer of 70% DADMAC and 30% DMAEA.BCQ was compared against an epichlorohydrin/dimethylamine (Epi/DMA) polymer to evaluate their performance in removing color from papermaking effluent at a pH of 10.9. The results are set forth below in Table 5:

TABLE 5

| POLYMER DOSAGE (PPM) | PT.CO.COLOR UNITS | % COLOR REMOVAL |
|---|---|---|
| EPI/DMA | | |
| 50 | 186 | 70 |
| 100 | 148 | 76 |
| 150 | 138 | 77 |
| 200 | 186 | 70 |
| DADMAC/DMAEA.BCQ | | |
| 50 | 204 | 67 |
| 100 | 108 | 83 |
| 150 | 96 | 85 |
| 200 | 116 | 81 |

As demonstrated above the hydrophobic polyelectrolyte copolymer of DADMAC and DMAEA.BCQ exhibited increased color removal at higher dosages verses the Epi/DMA polymer.

EXAMPLE 11

A hydrophobic polyelectrolyte copolymer of 70% DADMAC and 30% DMAEA.BCQ was compared against an epichlorohydrin/dimethylamine (Epi/DMA) polymer to evaluate their performance in removing color from papermaking effluent at a pH of 10.34. The results are set forth below in Table 6:

TABLE 6

| POLYMER DOSAGE (PPM) | PT.CO.COLOR UNITS | % COLOR REMOVAL | COMMENTS |
|---|---|---|---|
| EPI/DMA | | | |
| 0 | 1144 | — | Base Color |
| 40 | 456 | 60 | |
| 50 | 420 | 63 | |
| 70 | 278 | 76 | |
| 100 | 236 | 79 | |
| 150 | 196 | 83 | |
| 200 | 196 | 83 | |
| 250 | 222 | 81 | |
| 300 | 248 | 78 | |
| DADMAC/DMAEA.BCQ | | | |
| 0 | 1144 | — | Base Color |
| 100 | 288 | 75 | |
| 150 | 190 | 83 | |
| 175 | 166 | 85 | |
| 200 | 166 | 85 | |
| 250 | 166 | 85 | |
| 300 | 194 | 83 | |
| 400 | 300 | 74 | |

As demonstrated above the hydrophobic polyelectrolyte copolymer of DADMAC and DMAEA.BCQ exhibited increased color removal at higher dosages verses the Epi/DMA polymer.

EXAMPLE 12

The hydrophobic polyelectrolyte copolymers of 70% DADMAC/30% DMAEA.BCQ and 90% DADMAC/10% DMAEA.BCQ were compared against an epichlorohydrin/dimethylamine (Epi/DMA) polymer to evaluate their performance in removing color from papermaking effluent at a pH of 7.44. The results are set forth below in Table 7:

TABLE 7

| POLYMER DOSAGE (PPM) | PT.CO.COLOR UNITS | % COLOR REMOVAL | COMMENTS |
|---|---|---|---|
| EPI/DMA | | | |
| 0 | 608 | — | Base Color |
| 50 | 178 | 71 | |
| 80 | 124 | 80 | |
| 100 | 102 | 83 | |
| 150 | 128 | 79 | |
| DADMAC/DMAEA.BCQ (70:30) | | | |
| 0 | 608 | — | Base Color |
| 50 | 172 | 72 | |
| 80 | 126 | 79 | |
| 100 | 100 | 84 | |
| 150 | 86 | 86 | |
| DADMAC/DMAEA.BCQ (90:10) | | | |
| 0 | 608 | — | Base Color |
| 50 | 166 | 73 | |
| 80 | 108 | 82 | |
| 100 | 86 | 86 | |
| 150 | 180 | 70 | |

As demonstrated above the hydrophobic polyelectrolyte copolymer of 70% DADMAC and 30% DMAEA.BCQ exhibited the best color removal at higher dosages.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A semi-batch process for making a hydrophobic polyelectrolyte copolymer which comprises the steps of:
   adding diallyldimethylammonium chloride to a polymerization reactor vessel in an amount between about 1 to about 19 weight percent;
   heating the diallyldimethylammonium chloride to a temperature in the range between about 47° C. to about 57° C.;
   adding a polymer initiator dropwise to said diallyldimethylammonium chloride in an amount between about 0.05 to about 0.4 weight percent;
   adding a hydrophobic monomer selected from the group consisting of quaternized dimethyl aminoethylacrylates and quaternized dimethylaminoethylmethacrylates dropwise to said diallyldimethylammonium chloride in an amount between about 3 to about 19 weight percent; and
   heating the mixture of diallyldimethylammonium chloride, polymer initiator and hydrophobic monomer to a temperature in the range between about 47° C. to about 82° C.

2. The process according to claim 1 wherein deionized water is added periodically as needed during the polymerization process in an total amount between about 63 to about 80 weight percent.

3. The process according to claim 1 wherein said diallyldimethylammonium chloride is mixed with NaCl and deionized water prior to addition to said reactor vessel.

4. The process according to claim 3 wherein said diallyldimethylammonium chloride solution has a concentration of diallyldimethylammonium chloride in the range between about 54 to about 59.

5. The process according to claim 1 said diallyldimethylammonium chloride, polymer initiator and hydrophobic monomer are heated at a temperature in the range between about 47° C. to about 57° C. for a period of between about 4 to 6 hours.

6. The process according to claim 5 further comprising the step of increasing the temperature at which said diallyldimethylammonium chloride, polymer initiator and hydrophobic monomer are heated, said temperature is increased to about 72° C. to about 82° C. for a period of between about 4 to 6 hours.

7. The process according to claim 1 wherein said polymer initiator is selected from the group consisting of: 2,2'-azobis(2-amidinopropane) hydrochloride, ammonium persulfate, 2,2'-azobis(N,N'-dimethylene isobutylamide) dihydrochloride, and ammonium persulfate/sodium meta bisulfite.

8. A method for removing color from a paper mill waste effluent which comprises the step of adding a hydrophobic polyelectrolyte copolymer to said effluent, said hydrophobic polyelectrolyte copolymer comprising a diallyldimethylammonium chloride and a hydrophobic monomer selected from the group consisting of: quaternized dimethylaminoethylacrylates and quaternized dimethylaminoethylmethacrylates.

9. The method according to claim 8 wherein said quaternized dimethylaminoethylacrylate is selected from the group consisting of: dimethylaminoethylacrylate having $C_8$ to $C_{20}$ chloride quaternaries.

10. The method according to claim 9 wherein said quaternized dimethylaminoethylacrylate having $C_8$ to $C_{20}$ chloride quaternary is either dimethylaminoethylacrylate benzyl chloride quaternary or dimethylaminoethylacrylate cetyl chloride quaternary.

11. The method according to claim 8 wherein said quaternized dimethylaminoethylmethacrylate is selected from the group consisting of: dimethylaminoethylmethacrylate methyl chloride quaternary and dimethylaminoethylmethacrylate having $C_8$ to $C_{20}$ chloride quaternaries.

12. The method according to claim 11 wherein said quaternized dimethylaminoethylmethacrylates having $C_8$ to $C_{20}$ chloride quaternary are either dimethylaminoethylmethacrylate benzyl chloride quaternary or dimethylaminoethylmethacrylate cetyl chloride quaternary.

13. The method according to claim 8 wherein said diallyldimethylammonium chloride and said hydrophobic monomer are present in a molar ratio in the range from 99:1 to 20:80.

14. The method of claim 1 wherein the quaternized dimethylaminoethylacrylate is selected from the group consisting of: dimethylaminoethylacrylate having $C_8$ to $C_{20}$ chloride quaternaries.

15. The method according to claim 14 wherein the quaternized dimethylaminoethylacrylate having $C_8$ to $C_{20}$ chloride quaternary is either dimethylaminoethylacrylate benzyl chloride quaternary or dimethylaminoethylacrylate cetyl chloride quaternary.

16. The method according to claim 1 wherein the quaternized dimethylaminoethylmethacrylate is selected from the group consisting of: dimethylaminoethylmethacrylate methyl chloride quaternary and dimethylaminoethylmethacrylate having $C_8$ to $C_{20}$ chloride quaternaries.

17. The method according to claim 14 wherein said quaternized dimethylaminoethylmethacrylates having $C_8$ to $C_{20}$ chloride quaternary are either dimethylaminoethylmethacrylate benzyl chloride quaternary or dimethylaminoethylmethacrylate cetyl chloride quaternary.

18. The method according to claim 1 wherein said diallyldimethylammonium chloride and said hydrophobic monomer are present in a molar ratio in the range from 99:1 to 20:80.

* * * * *